United States Patent
Mercier

[11] 3,960,178
[45] June 1, 1976

[54] PRESSURE VESSEL

[76] Inventor: Jacques H. Mercier, 14, rue des Sablons, 75116 Paris, France

[22] Filed: Sept. 25, 1974

[21] Appl. No.: 509,251

[52] U.S. Cl. ............................................... 138/30
[51] Int. Cl.² ......................................... F16L 55/04
[58] Field of Search ............. 138/30, 31; 92/92, 169

[56] References Cited
UNITED STATES PATENTS

| | | | |
|---|---|---|---|
| 3,035,614 | 5/1962 | Kirk | 138/30 |
| 3,450,163 | 6/1969 | Mercier et al. | 138/30 |
| 3,477,473 | 11/1969 | Henry-Biabaud | 138/30 |
| 3,690,347 | 9/1972 | Zahid | 138/30 |

*Primary Examiner*—Richard E. Aegerter
*Assistant Examiner*—James E. Bryant, III
*Attorney, Agent, or Firm*—Arthur B. Colvin

[57] ABSTRACT

This invention relates to a pressure vessel for gas and oil under pressure comprising a container of rigid material having a cylindrical body portion defining a mouth at one end and closed at its other end, said closed end having an axial port. An annular supporting member of resilient sheet metal has a cylindrical upper portion of diameter just slightly less than that of the mouth portion of the container so that it may readily fit therein. An annular lower portion depends from said upper portion and the rim of a bladder is bonded to said lower portion, with a portion of the bladder material on the outer surface of said annular lower portion abutting and being compressed against the inner wall surface of the container to define an oil seal. A cylindrical closure plug or cover having an annular groove in the side wall thereof is positioned in the cylindrical upper portion of said supporting member with the inner periphery of the side wall of the plug abutting against and compressing the portion of the bladder material on the inner surface of the annular lower portion of the supporting member to define a gas seal.

5 Claims, 7 Drawing Figures

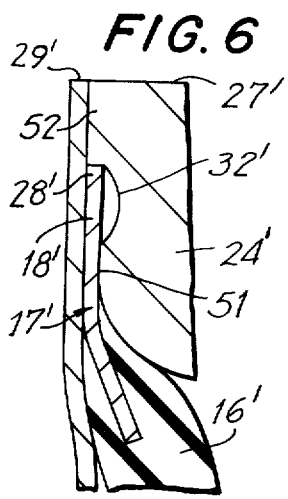
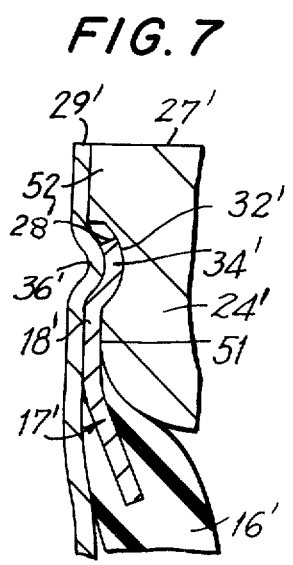
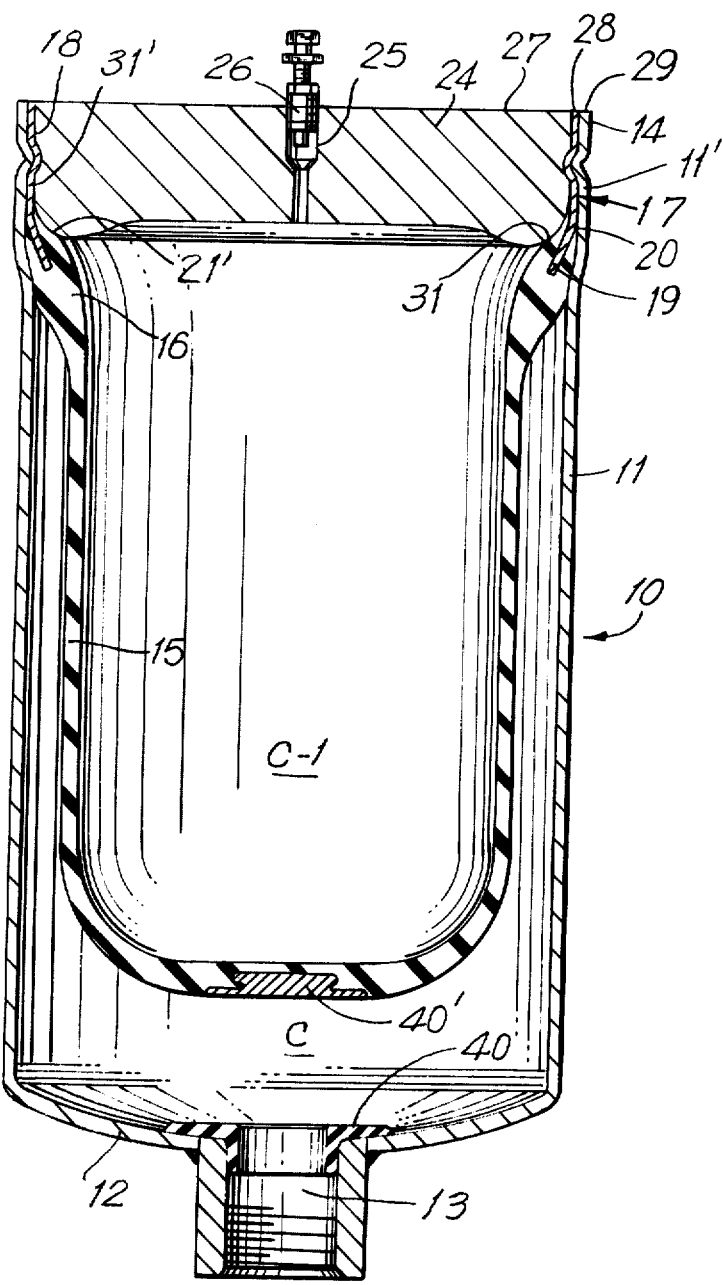

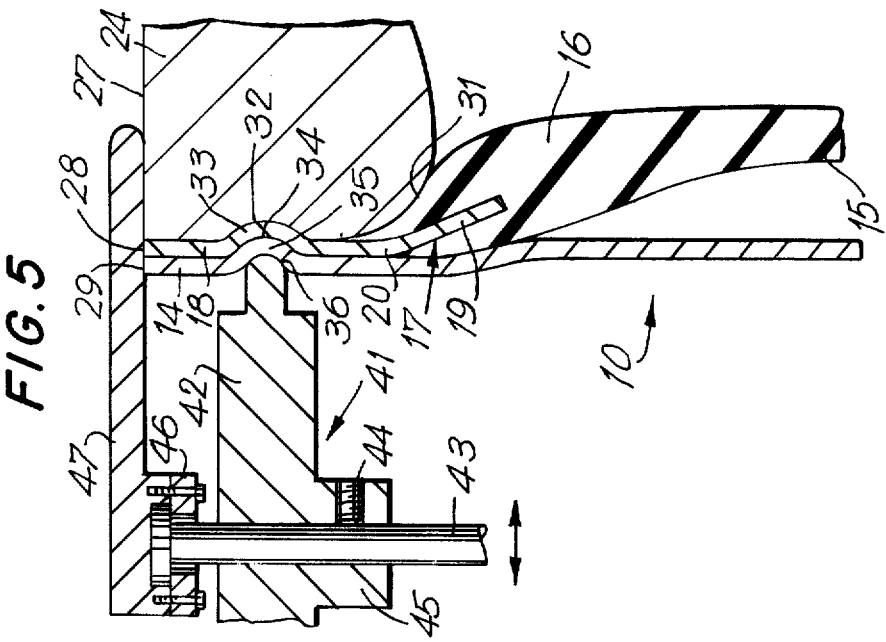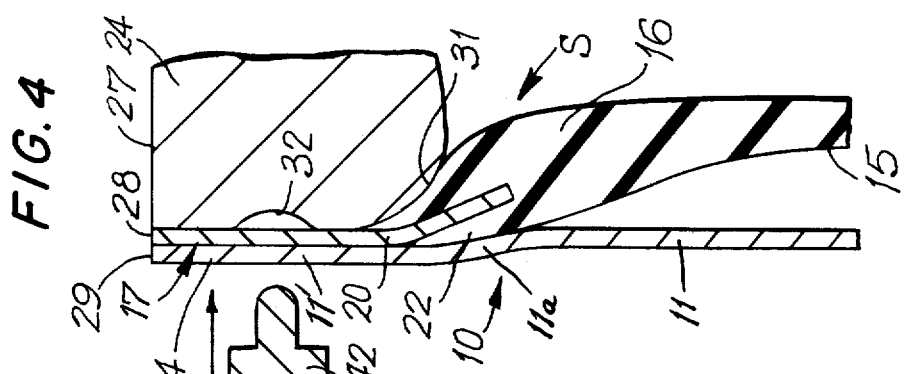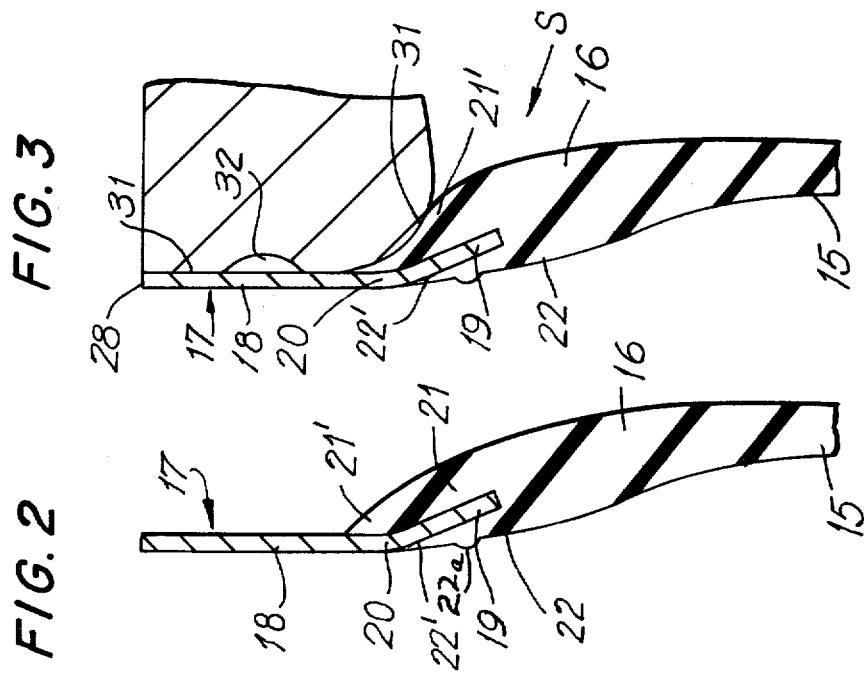

PRESSURE VESSEL

The wall of the container and the cylindrical portion of the supporting member are both deformed inwardly, to define locking formations in the form of inwardly extending nesting annular deformations which coact with the annular groove in the closure plug dependably to retain the plug and the supporting member in fixed position in the container.

As conducive to an understanding of the invention, it is noted that where it is desired to form a pressure vessel, and particularly a pressure vessel of the type having a deformable partition therein that is relatively inexpensive in cost, the number of elements employed and the number of manufacturing steps must be kept to a minimum.

Where to provide such low cost pressure vessel, a rigid shell or container is provided having a mouth at one end with a closure plug positioned therein and secured in place as by welding or by being screwed into a correspondingly threaded portion of the container mouth and with a deformable bladder having an enlarged mouth bonded to one edge of an annular supporting member, the other edge of which is secured to the mouth of the container as by welding, the time involved in the welding and/or threading operations adds greatly to the cost of the finished pressure vessel.

It is accordingly among the objects of the invention to provide a pressure vessel of the above type which may readily be formed with a minimum number of components and relatively few operations and which will dependably retain a closure plug and a deformable bladder in position with assurance that no leakage will occur from the pressure vessel.

According to the invention these objects are accomplished by the arrangement and combination of elements hereinafter described and more particularly recited in the claims.

In the accompanying drawings in which are shown various possible embodiments of the several features of the invention:

FIG. 1 is a longitudinal sectional view of a pressure vessel according to one embodiment of the invention;

FIG. 2 is a fragmentary longitudinal sectional view of an enlarged scale showing a portion of the supporting member and bladder of the embodiment of FIG. 1;

FIG. 3 is a view similar to FIG. 2 showing the subassembly of the supporting member, bladder and cover member;

FIG. 4 is a view similar to FIG. 2 showing the elements assembled and in readiness for the final manufacturing step;

FIG. 5 is a view similar to FIG. 4 showing the final manufacturing step to form the finished pressure vessel;

FIG. 6 is a view similar to FIG. 4 of another embodiment of the invention; and

FIG. 7 is a detail view similar to FIG. 5 of the embodiment of FIG. 6.

Referring now to the drawings, the pressure vessel comprises a container 10 of rigid material such as steel or aluminum capable of withstanding the pressure to which the unit will be subjected in use. As the pressure vessel herein is designed for relatively low pressure use, in the order of 750 P.S.I., the wall thickness of the container is relatively small.

The container 10 has a substantially cylindrical wall along the major portion of its length as at 11, being hemispherical at one end as at 12, with an axial port 13, and having an open mouth 14 at its other end, said mouth being of slightly enlarged diameter as at 11' to define a beveled annular shoulder 11a.

Positioned in the container 10 is a deformable partition 15, illustratively a collapsible and expansible bladder which desirably is of resilient material such as rubber or synthetic plastic of like physical characteristics.

The enlarged diameter mouth of the bladder 15 has a thickened rim 16 to which an annular supporting member 17 is affixed, preferably by being bonded thereto or molded therein as illustratively shown. The supporting member 17 is of resilient sheet material, illustratively sheet steel, and has a cylindrical upper retaining portion 18 and a lower mounting portion 19 inclined inwardly from the lower edge 20 of retaining portion 18.

The mounting portion 19 of supporting member 17 is molded into the rim 16 of bladder 15 in such manner that the inner and outer surfaces of portion 19 have layers 21, 22 respectively of bladder material thereon, the upper edge 21' of layer 21 extending slightly above the lower edge 20 of cylindrical retaining portion 18, the outer surface of layer 22 lying in a vertical plane that does not extend outwardly beyond the outer surface of portion 18, to facilitate removal of the supporting member 17 and bladder 15 from the mold in which the bladder is formed and molded to the supporting member. Preferably the outer layer 22 is formed with an integral outwardly projecting annular bead 22a which defines a seal.

The outer diameter of cylindrical retaining portion 18 is slightly less than that of the inner enlarged diameter portion 11' of the container 10 at the mouth 14 thereof so that it will readily fit therein, with the sealing bead 22a of the layer 22 of bladder material being compressed against the inner wall surface of the beveled annular shoulder 11a of the container to define a seal.

Positioned in the cylindrical retaining portion 18 is a cylindrical plug or cover member 24 which has an axial bore 25 defining a port in which a gas valve 26 is mounted. The bladder 15, which is interposed between the ports 13 and 25, defines a liquid chamber C in communication with port 13 and a gas chamber C-1 in communication with port 25.

The thickness of plug 24 as shown in FIGS. 1 and 3 to 5 is such that when it is positioned in the cylindrical retaining portion 18 of supporting member 17 with the outer surface 27 of the plug flush with the upper edge 28 of retaining portion 18 and the edge 29 of the mouth 14 of the container 10, the rounded inner edge 31 of the plug will press against the upper edge 21' of the layer 21 of bladder material.

The side wall 31' of plug 24 has an annular groove 32 in which is positioned an inwardly extending annular bead or rib 33 formed by an annular depression or deformation 34 in the outer surface of retaining portion 18. The annular depression 34 has nested therein an inwardly extending annular rib 35 formed by an annular depression 36 in the outer surface of the container 10 adjacent its mouth 14.

Thus the plug 24 and the annular supporting member 17 will be securely retained in the mouth 14 of the container 10 without need for any additional retaining means such as welding.

By reason of the fact that the rounded inner edge 31 of plug 24 will press against and compress the upper edge 21' of the bladder material, a dependable seal will be provided that will prevent leakage of gas from gas chamber C-1 when the latter is charged with gas under pressure through valve 26, the compressed resilient bladder material functioning as an O-ring when subjected to the gas pressure in the chamber C-1. Similarly, by reason of the fact that the layer 22 of bladder material and particularly the annular bead 22a will be compressed against the inner wall surface of the container 10 as at 11a, a dependable seal will be provided that will prevent leakage of liquid from liquid chamber C when the latter is charged with liquid under pressure through port 13, the compressed resilient bladder material functioning as an O-ring when subjected to the liquid pressure in chamber C.

The port 13 has a valve seat 40 at its inner periphery adapted to be closed by a valve member or button 40' axially mounted on the closed end of bladder 15.

To assemble the pressure vessel above described, and shown in FIG. 1, the plug 24 is forced into the cylindrical portion 18 of supporting member 17 until the outer surface 27 of the plug is flush with the upper edge 28 of cylindrical portion 24, as shown in FIG. 3. In such position the rounded inner edge 31 of the plug 24 will press against the layer 21 of bladder material on the inner surface of the supporting member 17.

Thereupon the sub-assembly S consisting of the pre-assembled plug 24 and supporting member 17 with the bladder 15 molded thereto is forced into the mouth 14 of the container 10 until the upper edge 28 of cylindrical portion 18 and the outer surface 27 of plug 24 are both flush with the edge 29 of mouth 14 of the container 10 as shown in FIG. 4.

Due to the fact that the layer 22 of bladder material, including the annular bead 22a, lies in a plane extending outwardly beyond the plane of the inner surface of the wall portion 11 of the container, as the cylindrical portion 18 is forced into the enlarged portion 11' of the mouth 14 of the container, against shoulder 11a and the adjacent surface of wall portion 11, the layer 22 will be compressed frictionally to retain the sub-assembly S in position.

Thereupon the thus assembled unit is positioned in a suitable supporting jig (not shown) rotatable on a vertical axis and in juxtaposition to a rolling tool 41. As shown in FIG. 5 the tool comprises a roller 42 secured to a vertical shaft 43 by a set screw 44 extending through the hub 45 of the roller. The shaft 43 is mounted so that it may be rotated and also moved transversely back and forth as indicated by the arrows. The upper end of shaft 43 is rotatably mounted in a bearing 46 secured to a guide arm 47 adapted to rest on the edge 29 of the mouth of the container 10.

The vertical postion of roller 42 on shaft 43 is adjusted so that the distance between guide arm 47 and roller 42 will be equal to the distance between the outer surface 27 of plug 24 and annular groove 32. Thus, when the jig carrying the pressure vessel is rotated and the shaft 43 is rotated and moved transversely so that the roller 42 will press against the outer surface of the container, the annular depressions 36 and 34 will be formed in the container wall and the cylindrical wall portion 18 securely to lock the plug 24 and the supporting member in fixed position in the container mouth.

The embodiment shown in FIGS. 6 and 7 is similar to the embodiment of FIG. 1, and corresponding elements have the same reference numerals primed.

In FIG. 6, the pressure vessel is shown before the components have been locked together by the rolling action previously described. It is to be noted that the plug 24' is of reduced diameter as at 51 defining an annular flange 52 adjacent its outer surface 27'. The annular groove 32' is located immediately below flange 52 and the edge 28' of supporting member 17' initially abuts against said flange 52 as shown in FIG. 6.

After the rolling action has occurred, the annular depressions 36' and 34' will be formed in the container wall and the cylindrical wall portion 18', securely to lock the plug 24' and the supporting member 17' in fixed position in the container mouth.

It is thus apparent that the embodiment of FIGS. 6 and 7, and that of FIG. 1, differ in that the depression 34' is formed adjacent the upper edge 28' of the cylindrical portion 18' of the supporting member 17' rather than substantially mid-way between the ends of cylindrical portion 18', and the plug 24' has an annular flange 52 at its upper surface rather than being uniformly of one outer diameter.

It is to be noted that the rolling tool could form other types of depressions in the container wall and in the supporting member and the groove in the plug could also be of configuration other than arcuate in cross-section.

Having thus described the invention and illustrated its use, what is claimed as new and is desired to be secured by Letters Patent is:

1. In a pressure vessel comprising a container having a cylindrical wall portion having an inner surface, said cylindrical wall portion being closed at one end and defining a mouth at its other end, said closed end having a port, a deformable partition of resilient deformable material in said container having an annular rim for defining a first and a second fluid chamber, an annular supporting member having a cylindrical upper portion positioned in the cylindrical wall portion of the container adjacent its mouth, and having an annular lower portion having an inner and outer surface to which the rim of said partition is bonded, a cover member having a port and fixed in said cylindrical upper portion of said container with said supporting member therebetween, the improvement comprising said cover member having a cylindrical side wall portion having a rounded inner edge and having an annular groove in said side wall portion defining a locking conformation, said wall portion of said container and the cylindrical upper portion of said supporting member having complementary engaging locking conformations formed integrally therewith complementary to the locking conformation in said cover member and which coact therewith to retain said cover member and said supporting member in fixed position in said container with the lower edge of said supporting member projecting downwardly of the inner edge of said cover member, means for sealing said first and said second chamber relative to said cylindrical wall portion and said cover member, said sealing means comprising the rim of said partition including deformable layers covering at least a portion of said inner and outer surface of the annular lower portion of said supporting member, the outer surface of the lower portion of the supporting member being compressed against said inner surface of said cylindrical wall of the container, the inner rounded edge of the side wall of the cover member abutting against the layer on said inner surface of the annular lower portion of said supporting member and wherein said wall portion of the container adjacent its mouth is of enlarged diameter defining an annular shoulder, the outer surface of the layer of bladder material on the outer surface of the lower portion of the annular supporting member abutting against said annular shoulder, and said rounded inner edge of said cover and said annular shoulder cooperating to sealingly compress said annular rim of said deformable partition whereby said first fluid chamber and said second fluid chamber are sealed independently of the locking conformations retaining said cover member and said supporting member in fixed position in said container.

2. The combination set forth in claim 1 in which said complementary engaging locking conformations comprise an annular inwardly extending deformation in the wall portion of said container and in said cylindrical upper portion of said supporting member defining annular beads on the inner surfaces thereof respectively, the annular bead of the wall portion nesting in the annular deformation in the cylindrical upper portion, and the annular bead in the cylindrical upper portion nesting in the annular groove in the cover member.

3. The combination set forth in claim 2 in which said cover member is a plug of reduced diameter at one end defining an annular flange, said annular groove in said plug being located adjacent said flange, said supporting member having a free edge, the annular bead in the cylindrical upper portion of said supporting member being located adjacent said free edge thereof.

4. The combination set forth in claim 1 in which said partition is a bladder having a thickened rim molded to the lower portion of said supporting member, said rim having an outer surface compressed against the inner surface of the cylindrical wall of the container, the inner edge of the side wall of the cover member abutting against the inner surface of said rim, said locking conformations comprising nesting annular deformations in the container wall and cylindrical upper portion of said supporting member.

5. The combination set forth in claim 1 in which the annular lower portion of said supporting member is inclined inwardly, the partition is a bladder having an enlarged mouth in which the annular lower portion is molded with layers of bladder material on said inner and outer surfaces of said lower portion, at least a portion of the layer on the outer surface being compressed against the inner surface of the container wall and with said inner edge of the side wall of the cover member abutting against the layer on the inner surface.

* * * * *